June 11, 1946.  A. G. GAULIN  2,402,035
ARTICLE TRANSFER
Filed Jan. 6, 1944
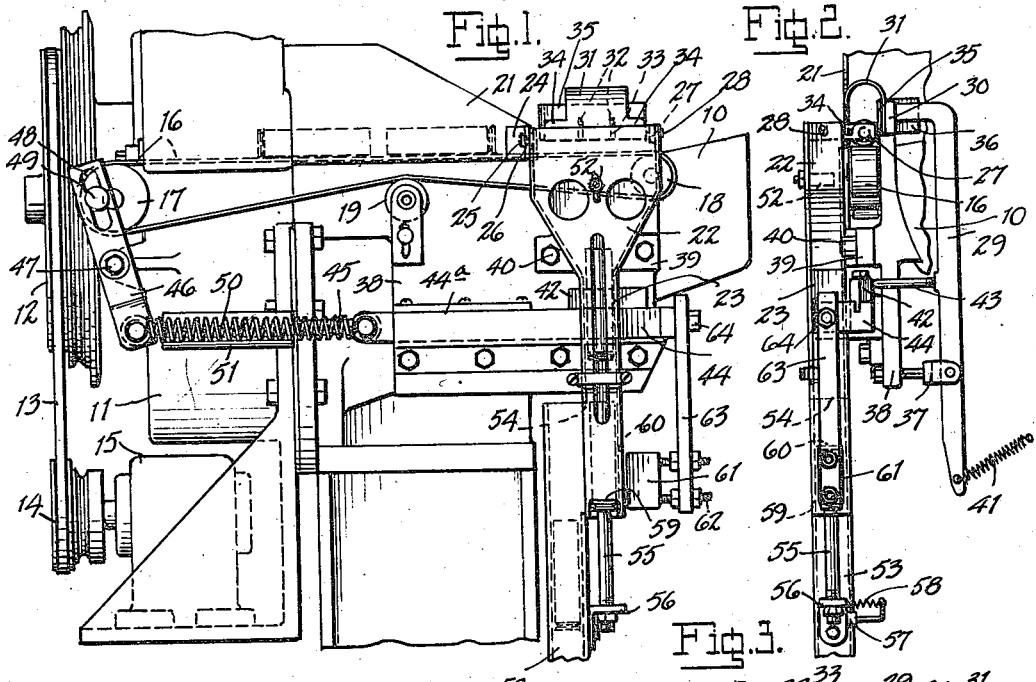
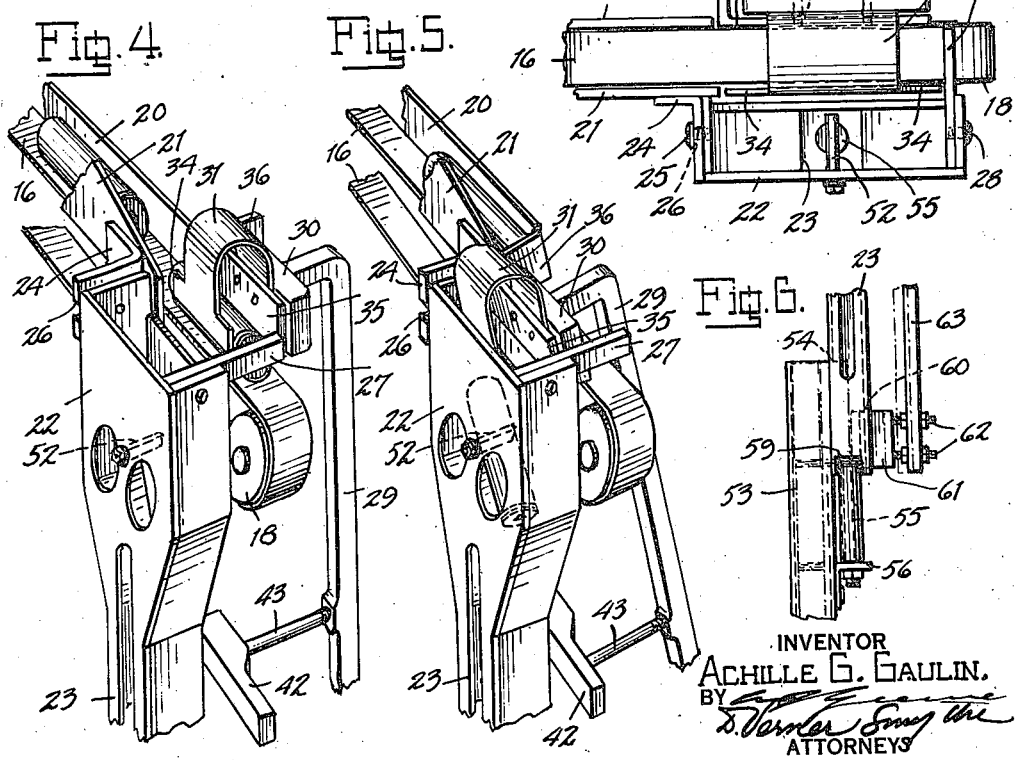
INVENTOR
ACHILLE G. GAULIN.
BY
ATTORNEYS Patented June 11, 1946

2,402,035

UNITED STATES PATENT OFFICE 2,402,035

ARTICLE TRANSFER

Achille G. Gaulin, Lowell, Mass., assignor to Remington Arms Company, Inc., Bridgeport, Conn., a corporation of Delaware Application January 6, 1944, Serial No. 517,182

6 Claims. (Cl. 198—24)

The present invention relates to article transfer, and particularly to the delivery of elongated articles, in successive end to end relation and in uniform positions of orientation, to a machine for performing an operation thereon. While the invention may find application in the transfer of various types of elongated articles, it is especially adapted to the transfer of ammunition components, such as cartridge cases in the process of manufacture, these cases being delivered through a tube with their head ends foremost to a machine for performing an operation thereon. In practice the components are ordinarily dumped into a hopper which conducts them to a paddle wheel by which single components are carried upward out of the mass and delivered onto a narrow feed belt, the components thus being arranged upon the feed belt in end to end relation with either the head end or the open end foremost. The components are thereupon ejected laterally from the belt into the widened mouth of the delivery tube, in which is arranged a transverse partition pin or wall upon which the components drop sidewise, so that their heavy head ends overbalance and fall downwardly in the tube irrespective of which side at which the head end is disposed, the components being thus fed into the tube with their head ends down and flowing by gravity thereto to the machine for performing the particular operation thereon. Machines of this general type are well known and are in common use in the ammunition manufacturing industry.

These known machines include a reciprocating ejector operating across the end of the belt for removing the components therefrom to the upper end of the tube, and further include automatic means for rendering the ejector inoperative in the event of a jam in the machine causing the delivery tube to become filled to a point where it is undesirable to feed additional components therein. This automatic means usually consists of a reciprocating feeler finger which moves transversely into the tube to contact the sides of the components flowing therethrough, the inward movement of this feeler finger being arrested by contact with the component when its gravity movement is stopped through the filling of the tube, the ejector being so co-related with the feeler finger that upon arresting of the movement of the latter the feeding actuation of the ejector is stopped.

With the ejector as heretofore used, it is possible for a component to become diagonally disposed as it was pushed from the belt to the delivery tube, particularly where the following component is inverted so that the two open ends of the components are in contact, and this very often results in a jam and stoppage of the machine, especially where the machine is being run at high speed. This arrangement also permitted an overlength component to be fed into the tube. It is an object of the present invention to provide an improved ejector adapted to prevent the component from assuming a diagonal position as it is fed from the belt to the tube, it being particularly proposed to provide an ejector adapted to extend over the component to embrace it at both its forward and rearward sides, to thus maintain it parallel to the direction of movement of the belt and to eject it laterally to the delivery tube while in such parallel relation.

A further object is to provide means cooperating with the ejector adapted to prevent feeding actuation of the ejector when the component is not fully fed into lateral alignment with the ejector tube, or in the event of the feeding upon the belt of an overlength component, thereby preventing the entry into the delivery tube of such overlength components.

In the previous type of transfer apparatus the feeler finger is apt to be momentarily arrested in its inward movement through contact with a component dropping through the tube, even when the delivery tube is not full, and this momentarily arrests the movement of the ejector so that the operation of the machine is apt to be slowed up. It is a further object of the invention to provide an improved feeler means which will have positive inward movement as long as there is a normal flow of components through the tube, and irrespective of the timing of the fall of the components through the tube, and to this end it is particularly proposed to provide in lateral alignment with the feeler member a laterally offset tube extension to which the component is fed laterally in line with the feeler member by inward movement of the feeler, inward movement of the feeler being arrested only when the offset extension becomes full.

It is further proposed to provide improved means for automatically preventing the delivery of an inverted component to the offset delivery tube, such means being so related to the feeler member that inward movement of the feeler member will be arrested by the inverted component to automatically stop the operation of the machine until such inverted component is removed.

In general the improvements of the invention result in substantial increase in the speed at which the machine may be effectually operated and in the productivity of the machine.

With the above and other objects in view an embodiment of the invention is shown in the accompanying drawing, and this embodiment will be hereinafter more fully described with reference thereto, and the invention will be finally pointed out in the claims.

In the drawing—

Fig. 1 is a side elevation, partially broken away, of an article transfer machine embodying the improvements of the invention.

Fig. 2 is an end elevation, partially broken away, looking inwardly toward the right hand end of the machine as seen in Fig. 1.

Fig. 3 is a plan view on an enlarged scale of the ejector means constituting part of the invention.

Fig. 4 is a fragmentary perspective view showing the ejector means in relation to the feed tube, and in its retracted position.

Fig. 5 is a similar perspective view showing the ejector means in its projected position.

Fig. 6 is a fragmentary side elevation of the feed tube showing the feeler member in contact with an inverted component, and further showing in dot-and-dash lines the feeler member in contact with a component when the feed tube is full, both conditions shown automatically rendering the ejector means inoperative.

Similar reference characters indicate corresponding parts throughout the several figures of the drawing.

Referring to the drawing, the article transfer means of the invention is illustrated in connection with a feeding machine in which the components are dumped into a hopper 10 which conducts them to a paddle wheel such as the paddle wheel, for example, shown in the patent to Crawford, No. 2,341,265, disposed within a cylindrical casing portion 11 and operated by a pulley 12, driven by a belt 13 from the pulley 14 of the motor 15, the components being carried up by the paddle wheel and individually delivered therefrom to a feed belt 16 carried upon a drive pulley 17 and a supporting pulley 18, and adapted to be tightened at its under side by a tightening pulley 19. The drive pulley 17 is driven in clockwise direction by a suitable bevel gear and pinion connection with the paddle wheel pulley 12. At each side of the upper traverse of this belt there are provided longitudinal guide strips 20 and 21 which retain the components traveling upon the belt against sidewise movement, these strips terminating adjacent the inner side of the upper widened end 22 with the gravity feed tube 23 disposed forwardly of the feed belt.

The outer guide strip 21 is mounted for lateral adjustment movement by means of an angle bracket member 24 secured upon the inner side wall of the upper end of the feed tube by means of a screw 25 engaged in a horizontal slot 26 of the bracket member, this outer guide strip being adapted to function as a length gauge in cooperation with a stop member 27 secured to the forward side wall of the upper end of the feed tube by means of a screw 28 to prevent the feed into the feed tube of overlength components, this stop member projecting laterally over the end of the feed belt to constitute a stop for the end of the component being fed thereby. The spacing of the end of the guide strip 21 from the stop member 27 substantially corresponds to the length of a standard length component with sufficient clearance to permit the lateral passage of such component from the belt to the feed tube, an overlength component, or a component that has not been completely fed into relation with the stop 27, being prevented from entering the feed tube through abutment of its side with the end of the guide strip as the component is moved laterally by the ejector, as will hereinafter more fully appear.

Upon the upper forwardly projecting end of the ejector actuating lever 29 there is provided an ejector head 30 to which the ejector member 31 is secured by means of screws 32. This ejector member is preferably formed of sheet metal, and is in the shape of an inverted U-shape yoke, having vertical slots 33 in its rearward leg portion in which the screws 32 are engaged, and provided at the lower ends of its forward leg portion with extensions 34 of such length between their ends as to engage substantially the full length of the component at its outer side. An ejector plate member 35 is also secured upon the head 30 by the screws 32, the inner leg of the ejector yoke member 31 being engaged between the head 30 and the plate 35. At the end of the plate 35 there is provided a right angularly disposed rearwardly projecting stop flange 36 adapted in the projected feeding position of the ejector to be disposed across the belt in the path of the components, to restrain feeding of the successive components while the first one is being ejected to the feed tube, the next component being fed into the ejector yoke upon its retraction.

The ejector actuating lever 29 is pivotally mounted upon a pivot support 37 secured to a supporting plate 38 mounted upon the side of the machine, this plate also constituting a mounting for the feed tube which is provided near its upper end with projecting mounting ears 39 secured to the plate by bolts 40. A spring 41 is connected between the lower end of the lever 29 below the pivot 37 and the frame of the machine, and is adapted to impart projecting component feeding movement to the ejector. Retracting movement is imparted to the ejector by means of a horizontally reciprocating cam 42 engaged by a pin 43 carried by the lever.

This cam 42 is carried upon a slide 44 having reciprocatory movement in a slideway 44ª, and connected by a rod 45 to a rock lever 46, pivotally mounted at 47 on the frame of the machine and connected at its upper slotted end 48 to an eccentric pin 49 carried upon the drive pulley 17 of the belt, and whereby rotation of the drive pulley actuates the rock lever to impart reciprocatory movement to the slide. A spring 50 is tied between the lower end of the rock lever and the slide, and the rod 45 is provided between the lever and the slide with a yieldable tubular coupling 51, for the purpose of allowing the rock lever to continue its normal operation when the retracting movement of the slide is arrested through the actuation of the component feeler mechanism, presently to be more fully referred to. In the forwardly moved position of the slide the pin 43 is engaged upon the high portion of the cam and the ejector actuating lever is in the retracted position, as shown in Figs. 2 and 4. In the retracted position of the slide the finger 43 rides onto the lower portion of the cam and through the pull of the spring 41 the lever is actuated to project the ejector, as shown in Fig. 5, moving the component from the belt to the tube, the component being maintained in parallel relation to the direction of movement of the belt while in engagement with the ejector yoke. The component drops against the pin 52 which directs its head end downwardly.

At its lower end the feed tube 23 is connected to a laterally offset extension feed tube 53, in communication at its upper end with the lower end of the tube 23 by means of a lateral passage 54 through which the components which drop to the lower end of the upper tube 23 may be laterally transferred to the lower tube 53 through which they thereupon drop through gravity to the machine for performing the operation upon the component. The base of the upper tube 23 is formed by means of a vertical post 55 mounted for vertical adjustment in a bracket 56 pivotally supported upon the side of the offset tube 53 and normally retained in its vertical position against a stop lug 57 by means of a spring 58. In addition to forming a base for the tube 23 this post is adapted to receive and eject any component which falls through the upper tube 23 in an inverted position, that is, with its open end down. The inverted component engages over the post as shown in Fig. 6, whereupon it may be removed by swinging the post forwardly, the lower end of the tube 23 being provided with a clearance cut-out 59 for this purpose.

The wall of the tube 23 is provided in lateral alignment with the transfer passage 54 and the opposed wall of the offset upper tube with a vertical slot opening 60 through which a feeler member 61 is adapted to engage, for the purpose of transferring the component resting upon the upper end of the post 55 at the lower end of the tube 23 laterally to the tube 53. This feeler member is adjustably supported by means of mounting screws 62 upon the lower end of a bar 63 secured at its upper end upon the forward end of the reciprocating slide 44 by means of a bolt 64, so that during each reciprocation of the slide to actuate the ejector operating cam 42 the feeler member is projected and retracted through the slot opening 60 in the lower end of the tube 23.

During the normal feed of articles through the tubes the inward reciprocation of the feeler member will transfer the component at the lower end of the tube 23 laterally to the tube 53 where it will drop by gravity. At the same time, the cam 42 is moved to its retracted position, where the pin 43 engages the low portion of the cam to actuate the ejector to transfer a component from the feed belt to the upper end of the feed tube.

Should an overlength component be fed upon the belt its projecting end will abut the end of the outer guide strip 21, and being held parallel by the ejector yoke will arrest further projecting movement of the ejector until such overlength component is removed manually. In the case of a component which has not reached the stop 27, its projecting end will also abut the outer guide strip and prevent feed of such component to the tube until it has been fed against the stop member upon retraction of the ejector.

Should the offset tube 53 become filled so that the components therein reach the point where one is disposed in lateral alignment with the lower end of the upper feed tube 23, this component will prevent feed of the component in the lower end of the tube 23 to the offset tube, so that the full projecting movement of the feeler member will be arrested, as shown by the dot-and-dash lines in Fig. 6. Consequently the movement of the cam 42 will also be arrested so that the pin 43 of the ejector actuator lever remains upon the high portion of the cam and therefore prevents operation of the ejector lever until the upper end of the offset tube is clear. As soon as the tube is cleared the normal feed of the components resumes.

In the event that an inverted component drops upon the post 54, its head end will be interposed in the path of projecting movement of the feeler member and will therefore arrest its movement, as shown in full lines in Fig. 6, to render the ejector actuating lever inoperative until the inverted component is removed.

The form of the invention illustrated in the drawings and described herein is typical and illustrative only, and it is evident that the invention is capable of embodiments in other forms, all falling within the scope of the appended claims, which are to be broadly construed.

What is claimed is:

1. In an article transfer apparatus, feed means for feeding a succession of elongated articles in longitudinally aligned end to end relation, a second feed means laterally offset from the longitudinal line of said articles to receive articles moved transversely from said first feed means, ejecting means movable transversely of said first feed means to transfer articles thereon to said second feed means and having a longitudinal passage with forward and rearward side walls extending a substantial portion of the length of an article for receiving an article, said side walls being adapted to engage on two sides of said article to maintain it in substantially parallel relation to its line of feed upon said first feed means as it is moved transversely therefrom to said second feed means, a stop member engageable by the end of said article in said passage, and abutment means laterally offset from said first feed means and adapted to contact the end of an article extending beyond a predetermined distance from said stop.

2. In an article transfer apparatus, a gravity feed tube for elongated articles adapted to be fed therein in end to end relation, stop means at the base of said tube, a second gravity feed tube laterally offset from said first tube, there being a passage providing lateral communication between said first and second tubes for the lateral transfer of an article from the base of said first tube to the top of said second tube, and reciprocating feed means adapted to move said articles laterally through said passage from said first to said second tube, said second tube having an abutment wall in lateral line with said passage whereby an article in the upper end of said second tube arrests the transfer of an article from said first tube.

3. In an article transfer apparatus, a gravity feed tube for elongated articles adapted to be fed therein in end to end relation, stop means at the base of said tube, a second gravity feed tube laterally offset from said first tube, there being a passage providing lateral communication between said first and second tubes for the lateral transfer of an article from the base of said first tube to the top of said second tube, reciprocating feed means adapted to move said articles laterally through said passage from said first to said second tube, ejector means adapted to transfer articles to said first tube, means for imparting projecting and retracting movement thereto, and actuating means common to said ejector actuating means and said reciprocating feed means adapted when the projecting feed movement of said reciprocating feed means is arrested to render said common actuating means inoperative to project said ejector means.

4. In an article transfer apparatus, a gravity feed tube for elongated tubular articles, said tube being open at one end, said articles being adapted to be fed therein in end to end relation with their closed ends down, stop means at the base of said open end tube comprising a vertical post adapted to engage the closed end of an article to support it and to enter the open end of an inverted article, a second gravity feed tube laterally offset from said first tube, there being a passage providing lateral communication between said first and second tubes for the lateral transfer of an article from the base of said first tube to the top of said second tube, and feed means adapted to move said articles laterally from said first to said second tube means.

5. In an article transfer apparatus, a gravity feed tube for elongated tubular articles, said tube being open at one end, said articles adapted to be fed therein in end to end relation with their closed ends down, stop means at the base of said tube comprising a vertical post, adapted to engage the closed end of an article to support it and to enter the open end of an inverted article, a second gravity feed tube laterally offset from said first tube, there being a passage providing lateral communication between said first and second tubes for the lateral transfer of an article from the base of said first tube to the top of said second tube, and feed means adapted to move said articles laterally from said first to said second tube means, an inverted article upon said post being in the path of movement of said feed means to arrest its feeding movement.

6. In an article transfer apparatus, feed means for feeding a succession of articles in longitudinally aligned end to end relation, a second feed means laterally offset from the longitudinal line of said articles to receive articles moved transversely from said first feed means, ejecting means yieldingly movable transversely of said first feed means to transfer articles thereto from said second feed means and having a longitudinal passage with forward and rearward side walls extending a substantial portion of the length of an article for receiving an article, said side walls being adapted to engage two sides of said article to maintain it in substantially parallel relation to its line of feed upon said first feed means as it is moved transversely therefrom to said second feed means, and a stop member engageable by the end of an article in said passage, a gauging surface longitudinally spaced from said stop and adapted to contact the end of an article extending from said stop more than a predetermined amount and prevent feed thereof to said second feed means.

ACHILLE G. GAULIN.